May 31, 1932.  S. C. NELSON  1,861,283
GRAIN TANK
Filed Sept. 16, 1929
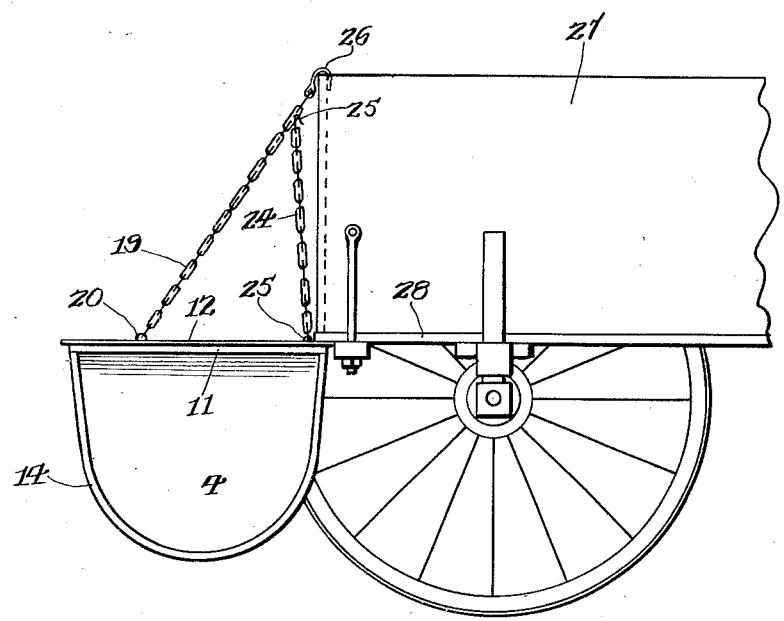
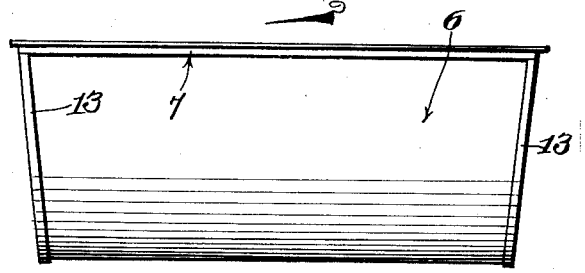
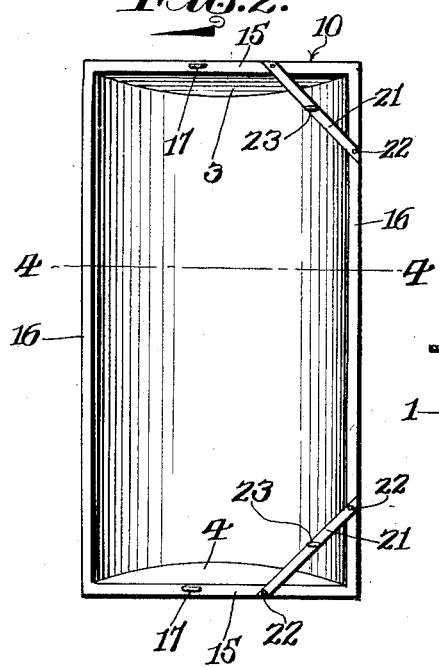
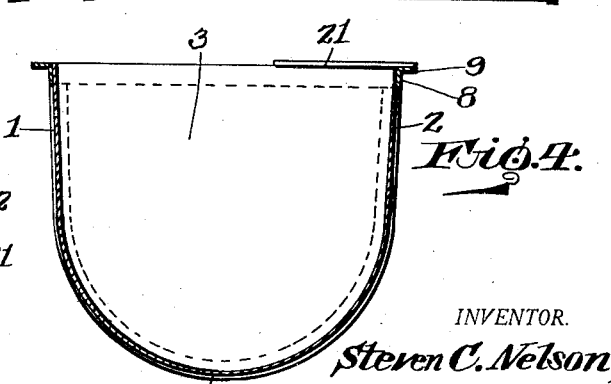
INVENTOR.
Steven C. Nelson,
Geo. P. Kimmel
ATTORNEY.

Patented May 31, 1932

1,861,283

UNITED STATES PATENT OFFICE

STEVEN C. NELSON, OF FINLEY, NORTH DAKOTA

GRAIN TANK

Application filed September 16, 1929. Serial No. 393,010.

This invention relates to a tank designed primarly for containing a body of grain to be dispensed or dipped therefrom, but it is to be understood that a tank, in accordance with this invention may be employed for any purposes for which it is found applicable, and the invention has for its object to provide, in a manner as hereinafter set forth, a tank for attaching to the rear of a wagon or other conveyance for holding a quantity of seed grain, thereby making it convenient to dip from the tank into the drill or seeder box while seeding grain in the field.

Further objects of the invention are to provide, in a manner as hereinafter set forth, a tank for the purpose referred to which is simple in construction and arrangement, strong, durable, thoroughly efficient in its use, readily installed with respect to a mobile structure, and comparatively inexpensive to set up.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a fragmentary view in side elevation of an ordinary farm wagon showing the adaptation therewith of a grain containing tank in accordance with this invention.

Figure 2 is a top plan view of the tank with the coupling chains therefor disconnected therefrom.

Figure 3 is a side elevation of the tank.

Figure 4 is a section on line 4—4, Figure 3.

The tank is designed to hold several bushels of seed grain that can be transferred to the grain drill or seeder without climbing in and out of the wagon for each shovel or measure full. Several bushels of grain can be transferred to the tank from the wagon by opening the end gate of the wagon and shoveling the grain back. A person on the ground can easily dip from the tank and transfer the seed into the drill box. The employment of the tank will provide for a material saving in time during the operation of the drill or seeder.

The body of the tank can be constructed of any suitable material, but preferably from sheet metal and further the cross sectional contour of the body of the tank can be as desired, but preferably of semi-oval contour. The body of the tank by way of example is shown as constructed from sheet metal and it is set up with a pair of sides 1, 2, a pair of ends 3, 4 and a bottom 5. Preferably the sides 1, 2 and bottom 5 are formed from a single length of sheet metal. The ends 3, 4 are arranged between and welded to the sides 1, 2, as well as welded to the bottom 5.

The length of sheet metal from which the sides 1, 2 and bottom 5 are formed is indicated generally at 6 and is so shaped that when bent to provide the sides 1, 2 and bottom 5, the ends thereof will incline outwardly in opposite directions so that the end walls 3, 4 when secured in position will incline outwardly in opposite directions from the bottom 5.

The outer face of the sides 1, 2 at the upper marginal portion thereof has secured thereto an angle bar 7 which is co-extensive therewith. The angle bars 7 are oppositely disposed with respect to each other and each includes an upstanding leg 8 and a horizontally disposed leg 9 which extends outwardly at right angles from the upper end of the upstanding leg 8. The marginal portion of the outer face of the end 3 or 4, at the upper portion of said outer face, has secured thereto an angle bar 10. Each of the angle bars 10 includes an upstanding leg 11 and a horizontally disposed leg 12 which projects outwardly at right angles from the upper end of the leg 11. The bars 10 abut the bars 7.

Each end of the tank is formed with a reinforcing strap 13 secured to the outer face of the sheet metal body 6 and extending from one angle bar 7 to the other angle bar 7. The ends of straps 13 abut against and are secured with the angle bars 7 by any suitable means.

Secured to the marginal portion of the outer face of the end 3 or end 4 is a reinforcing strap 14. The strap 14 is flush with the strap 13 and the ends of the straps 14 abut against and are suitably secured to the reinforcing or angle bars 10.

The horizontal disposed parts 9 of bars 7 and the horizontally disposed parts 12 of bars 10 coact to provide the top of the tank with an outwardly directed ledge co-extensive therewith. The ends of the ledge are indicated at 15 and the sides thereof at 16. Each end 15 of the ledge is formed with an upstanding eye 17 to which the lower end of a coupling chain 19 is attached, as at 20.

Secured to each end 15 of the ledge and to the inner side 16 of the ledge in proximity to the inner, upper corners of the tank are diagonally disposed, oppositely extending supporting bars 21. Hold-fast devices 22 are employed for securing the bars 21 to the ends and inner side of the ledge, and each bar 21 is provided centrally thereof with an upstanding eye 23 to which the lower end of a coupling chain 24 is attached, as at 25. The upper end of the chain 24 is detachably connected to chain 19 by a hook 26. The upper end of the chain 19 is provided with a hook 26 for the purpose of overlapping the tail gate of the wagon 27 for detachable connection with the latter. The two pairs of chains provide suspension members.

The inner side 16 of the ledge, which is formed at the top of the tank when the latter is used, is positioned against the lower face, at the rear end of the bottom 28 of the wagon 27, and the weight of the grain, in connection with the chains 19 and 24 provide for the suspending of the tank in the position to project rearwardly from the wagon, as shown in Figure 1. The bars 21 do not interfere with the operator when he is dipping the grain from the tank.

The coupling of the chains 24 to the bars 21 forwardly of the flange 16 enables for an unobstructed portion of the tank edge abutting against the bed of the wagon and which provides a material part of the support for the device.

It is thought the many advantages of a tank in accordance with this invention and for the purpose set forth can be readily understood, and although the preferred embodiment of the invention is as illustrated and described, yet it is to be understood that changes in the details of construction can be had which fall within the scope of the invention as claimed.

What I claim is:

1. A rectangular tank for the purpose set forth comprising an open top body portion including a rounded bottom and a pair of side and a pair of end walls, said end walls being secured to said side walls and bottom, a pair of end and a pair of side angle shaped members, each formed of a vertical and a horizontal flange, the horizontal flange projecting outwardly from the top of the vertical flange, each vertical flange being secured against the outer face of a wall at the upper marginal portion thereof and having its top flush with the upper edge of the wall, horizontally disposed oppositely inclined bars extended upon and having their inner ends connected with and inwardly of the ends of the horizontal flange of one of the angle shaped side members and extended upon and having their outer ends connected with the horizontal flanges of the angle shaped end members adjacent one end of the latter, coupling means for suspension elements attached to and projecting upwardly from the horizontal flanges of said end members forwardly of the outer ends of said bars, and suspension element coupling means connected to and projecting upwardly from and forwardly of the inner ends of said bars.

2. In combination, an open top tank body including a pair of ends and a pair of side walls, a pair of horizontally disposed oppositely inclined bars having their rear ends secured to the top of one of said side walls inwardly of the ends of the latter, said bars having their outer ends secured to the tops of said end walls between the mid-points of the tops of the end walls and one end of the latter, coupling means for suspension elements secured to the tops of the said end walls forwardly of the outer ends of said bars, and coupling means for suspension elements secured to said bars intermediate the ends of the latter and forwardly of the said side walls.

3. In combination, an open top tank body including a pair of ends and a pair of side walls, a pair of horizontally disposed oppositely inclined bars having their rear ends secured to the top of one of said side walls inwardly of the ends of the latter, said bars having their outer ends secured to the tops of said end walls between the mid-points of the tops of the end walls and one end of the latter, coupling means for suspension elements secured to the tops of the said end walls forwardly of the outer ends of said bars, coupling means for suspension elements secured to said bars intermediate the ends of the latter and forwardly of the said side walls, a pair of suspension elements, each having its lower end attached to a coupling means carried by an end wall, and a pair of suspension elements each having its upper end attached to one of said other suspension elements and its lower end attached to a coupling means carried by a bar.

In testimony whereof, I affix my signature hereto.

STEVEN C. NELSON.